Aug. 5, 1952   H. M. CREVELING   2,606,035
CARRIAGE STEP-STARTER
Filed Feb. 24, 1949

INVENTOR.
Hurley M. Creveling
BY
Harold F. Scribner

Patented Aug. 5, 1952

2,606,035

UNITED STATES PATENT OFFICE 2,606,035

CARRIAGE STEP-STARTER

Hurley M. Creveling, Elizabeth, N. J.

Application February 24, 1949, Serial No. 78,156

2 Claims. (Cl. 280—5.24)

This invention relates to wheeled vehicles, for example baby carriages, and is concerned more particularly with a device that will enable the operator of the vehicle to negotiate street curbings, stair steps and like abutments with ease and facility.

A primary aim of the invention is to overcome and eliminate the tendency of the wheels of a vehicle to lock in the pocket formed by an upright abutment, as a curbing or stair, and to provide a relatively inexpensive device constituted preferably in the form of an attachment, that may be firmly secured to any of a wide range of sizes and types of vehicles operable to prevent the wheels from falling into the stair pocket and thus facilitate the movement of the vehicle up or down stairs and similar abutments.

A further aim of the invention is to provide a wheeled vehicle with means automatically responsive to the encountering of an abutment of a height greater than half the wheel diameter, to effect a lifting of the vehicle so that the wheel is caused to engage with the abutment at a point well below the horizontal axis whereby on the continued forward movement, the underside of the wheel is caused to engage and roll over the abutment without difficulty.

Still another aim of the invention is to construct a device adaptable to a carriage or the like whereby the carriage may be traversed down precipitous abutments without the heretofore customary bouncing and jerking each time the wheels of the carriage passes from one step to another.

In achieving the aims of the invention it is now proposed to provide the vehicle with at least one projecting support positioned at an angle to the normal horizontal traction surface of the wheels of vehicle and disposed tangent to the rim of the wheel. In the example disclosed herein the inclined support extends from a point well above and well below the wheel axis and is disposed rearwardly of the rear wheels of the carriage. For two-wheeled vehicles such as a baby carriage, it is preferred to embody two such inclined supports and to position them wide apart adjacent the wheels. Each of the inclined and projecting supports is, in accordance with this invention, provided with a two-way slidable runner or abutment engaging member. The sliding runner is spring tensioned in each direction and normally occupies a position approximately at the height of the wheel axis but out at the periphery of the wheel. The sliding members project beyond the wheels and engage the curb or stair nose prior to the wheels and their sliding character assists in effecting a lifting of the vehicle in the general direction of the axes of the projecting supports until the corner of the curb or stair is brought more or less under the tread of the wheels. When abutment is passed and the weight of the vehicle is again transferred to the wheels, the sliding runners being spring tensioned to a midposition, move along their supports to their normal positions of rest ready for meeting the next step or curb.

On traversing the vehicle down a curb or stair step the sliding runners similarly engage with the corner of the step as the wheels roll thereover and support the vehicle as it is lowered to the next step. As the wheels engage the lower level, the load is taken off the runners and they again move to their normal midpositions of rest in readiness for the next lowering operation.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1 of the drawings represents a conventional baby carriage embodying the invention.

Figure 1:
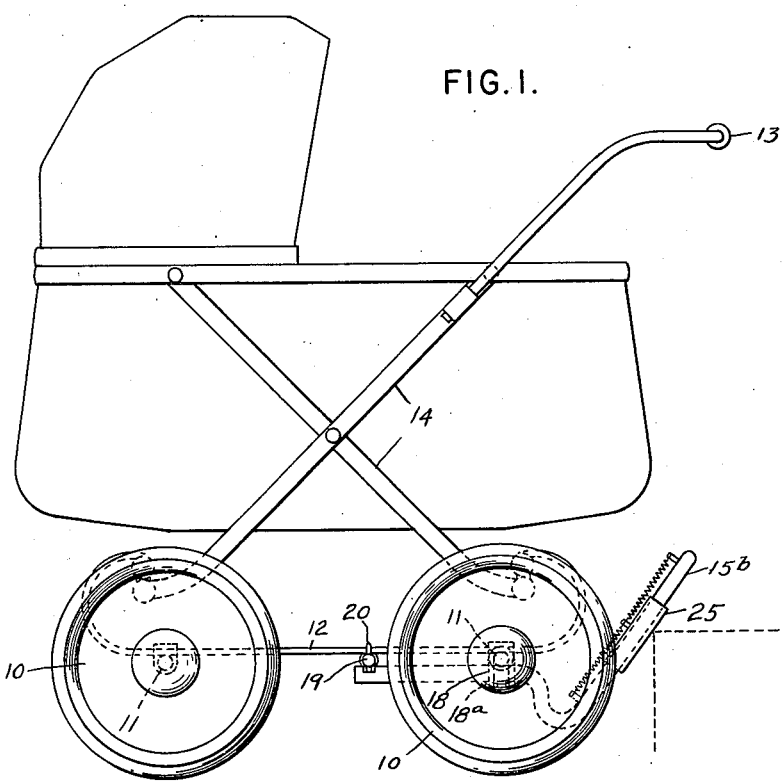

Referring more particularly to Fig. 1, the carriage illustrated is representative of a wheeled vehicle having the usual wheels 10, axles 11, wheel frame members 12, propelling handle 13 connected by cross-frame members 14 to the wheel frame members 12 in conventional manner. The step-starter is illustrated in operative position in relation to the rear pair of wheels of the carriage under the handle 13. While the device is illustrated with relation to the rear wheels of a carriage, it will be understood that it may be applied with relation to the front wheels if desired. However, the operator of a baby carriage usually lifts the carriage up or down stairs, etc. solely on the rear wheels, and the mounting of the device in that location facilitates the normal operation.

Figures 2, 3:
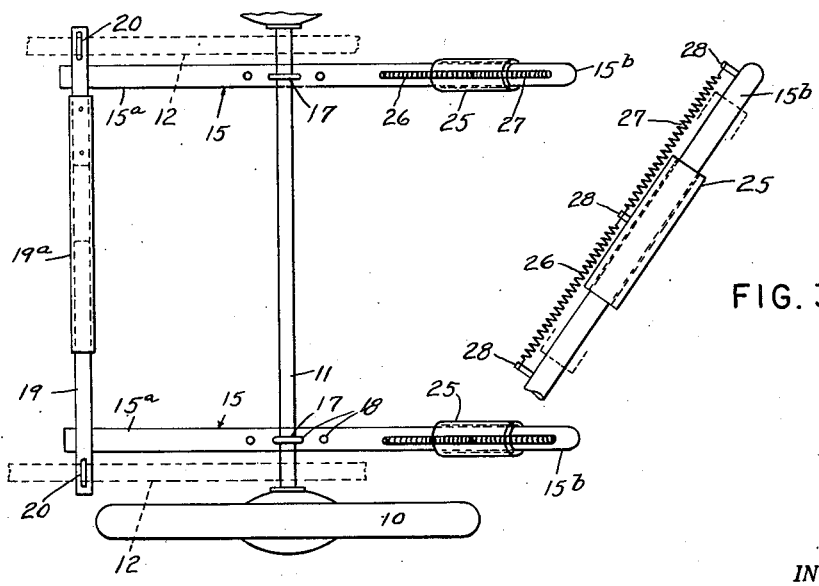
Fig. 2 is a plan view of the step starting attachment on a slightly larger scale, with portions of the vehicle illustrated in dotted lines.
Fig. 3 is a detail view of a preferred style of movable runner and its supporting means.

The construction of the step-starting device per se is disclosed more clearly in Figs. 2 and 3 and comprises a pair of spaced supports 15 each of which is bent medially so as to form two relatively diverging arms 15a and 15b. Arm 15a of each support is adapted to be secured to the wheel framing of the vehicle. The manner of attachment comprises preferably a U-bolt 17 that overlays the wheel axle 11 of the vehicle and passes through holes 18 in the support 15 and the parts firmly clamped by nuts 18a. The inner end of each of the supports 15 is welded or otherwise secured to a transversely extending bar 19, whose ends are secured, as by U-bolts 20 to the wheel frame members 12. Preferably the transversely extending bar 19 is telescopingly constructed, by means of a sleeve of 19a, whereby the side supports 15 may be adjusted in width to suit the wheel framing of a given vehicle. Preferably, a series of holes 18 is provided in each support 15 so that the runner portion thereof may be properly mounted relative to the wheels of carriages of different wheel sizes.

The opposite arm 15b of each of the supports 15 is caused to extend rearwardly and upwardly at an angle to the horizontal and in a position generally tangent to the outer surface of the carriage wheels 10, as illustrated more clearly in Fig. 1. Each of the supports is also provided with an axially slidable runner 25. In the instant embodiment, the runner 25 is in the form of an elongated sleeve that surrounds the inclined extension arm 15b and is movable therealong. Each of the runners is constrained normally to a midposition on its supports by means of pull springs indicated at 26 and 27. The springs are anchored to the support at opposite sides of the runner and to the runner by means of anchors 28, adequate space being provided on each side of the runner to allow for a total movement of the latter on the order of five inches, in the instant example.

As will be seen in Fig. 2, the two bent supports 15 lie in planes paralleling the planes of the wheels and are positioned closely thereto. Hence in operating the vehicle up or down a curb or stair, the effective width of the wheel base is not appreciably altered when the load is shifted from wheels to runners or conversely. It will also be observed that the inner ends of the inclined supports are maintained in spaced parallel relation by means of the cross bar connection 19 and the clamping of the assembly to the wheel framing of the carriage. This method of construction provides not only sturdy runner supports but also supports that require no intervening bracing that would interfere with walking space between the wheels of the carriage.

In the drawings the runner supports 15 are illustrated with an S-type of bend at the juncture of the arms 15a and 15b. A bend of the character shown enables the forward arms 15a to be mounted firmly to the wheel axles and framing at or about the level of the wheel axis, and at the same time provides a means for increasing the lower length of the inclined arms 15b so that adequate distance for runner travel from an upper extreme position to a lower extreme position well below the wheel axis is provided.

In using the carriage equipped with the invention the operator approaches the curb or step in the normal manner, rear wheels first. The underside of the runners 25 will, of course, abut the corner of the step and the continued movement of the vehicle causes the supports 15 to slide within the runners in a vehicle elevating direction. As the rim of the wheels reach the corner of the step, the wheel axes will be well above the step corner and in position to again support the load on the stair tread. When the load is transferred to the wheels, the runners which had moved relative to the supports, as indicated by the dotted line portions in Fig. 3, spring back to their midposition in readiness to engage with the next step. On propelling the vehicle down a curbing or step the reverse action occurs. The wheels roll over the corner of the step whereupon the runners 25 engage the corner of the step and the supports slide therethrough until the undersurface of the wheel rests upon the lower tread surface. A slight forward movement of the vehicle releases the runners and the latter again move to their midpositions. In either case, it will be seen, the wheels themselves are prevented from locking in the stair pockets and the vehicle as a whole is caused to glide easily over the stair corners.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A stair-climbing attachment for baby-carriages having a basket portion, a frame structure for the basket portion and attached handle means, and an under carriage for supporting the frame structure and wheel and axle elements of the carriage comprising, in combination, a pair of spaced apart generally Z-shaped bars, means for detachably securing one arm of each bar to the wheel axle of the rear wheels of the said under carriage in a position such that the free ends of the bars extend rearwardly and upwardly from a point below the axis of the rear wheels of the carriage and terminating at a point approximately horizontal with the top of the wheels, runner members slidably carried by the rearwardly and upwardly extending portion of each of said bars, each of said runner members having a portion positioned below its supporting bar adapted to engage a step corner or the like in advance of the engagement thereof by the rear wheels of the carriage, spring means tensioning said runner members normally to a medial position on the upwardly and rearwardly extending portions of the said bars and yieldable to allow said portions to slide relatively thereto during the ascent or descent of the carriage over the stair corner, and brace means secured to and extending transverse the said bars and positioned adjacent their opposite ends for retaining said bars in parallel spaced relationship so as to afford unobstructed space between the free ends of the bars for the feet of the operator of the carriage, and means detachably securing said cross brace to the said under-carriage at points forward of the attachment to the wheel axle.

2. The combination of claim 1 in which said cross brace member is telescopically constructed and arranged to vary the spacing of said bars in accordance with the width of the space between the wheels of the under-carriage of the carriage to which it may be secured.

HURLEY M. CREVELING.

REFERENCES CITED

The following references are of record in the file of this patent:

UNITED STATES PATENTS

| Number | Name | Date |
|---|---|---|
| 1,105,379 | Schulze | July 28, 1914 |
| 2,072,222 | Schuttkus | Mar. 2, 1937 |
| 2,459,275 | Gates | Jan. 18, 1949 |
| 2,467,644 | Wright et al. | Apr. 19, 1949 |

FOREIGN PATENTS

| Number | Country | Date |
|---|---|---|
| 820,563 | France | Aug. 2, 1937 |